(12) United States Patent
Alexia et al.

(10) Patent No.: US 8,069,123 B2
(45) Date of Patent: Nov. 29, 2011

(54) SECURE FRANKING MACHINE

(75) Inventors: Jean-Marc Alexia, Montrouge (FR);
Bruno Debuire, Garches (FR);
Dominique Montbrun, Champagne sur Oise (FR); Frédéric L'Hote, Paris (FR)

(73) Assignee: Pitney Bowes SAS, Cedex (FR)

( * ) Notice: Subject to any disclaimer, the term of this patent is extended or adjusted under 35 U.S.C. 154(b) by 1753 days.

(21) Appl. No.: 10/809,570

(22) Filed: Mar. 24, 2004

(65) Prior Publication Data

US 2004/0193549 A1  Sep. 30, 2004

(30) Foreign Application Priority Data

Mar. 25, 2003  (EP) .................................. 03290755

(51) Int. Cl.
*G06F 10/00* (2006.01)
*G06F 12/14* (2006.01)
(52) U.S. Cl. ........................ 705/401; 705/405
(58) Field of Classification Search .................. None
See application file for complete search history.

(56) References Cited

U.S. PATENT DOCUMENTS

| 4,802,218 | A |   | 1/1989  | Wright et al. |   |
|---|---|---|---|---|---|
| 4,813,912 | A |   | 3/1989  | Chickneas et al. |   |
| 4,864,618 | A |   | 9/1989  | Wright et al. |   |
| 5,185,866 | A | * | 2/1993  | Francisco | 710/100 |
| 5,799,290 | A |   | 8/1998  | Dolan et al. |   |
| 5,812,536 | A |   | 9/1998  | Manduely |   |
| 5,975,688 | A | * | 11/1999 | Kanaya et al. | 347/86 |
| 6,041,704 | A | * | 3/2000  | Pauschinger | 101/91 |
| 6,164,551 | A |   | 12/2000 | Altwasser |   |
| 6,212,505 | B1|   | 4/2001  | Herbert | 705/408 |
| 6,325,488 | B1| * | 12/2001 | Beerling et al. | 347/42 |
| 6,406,120 | B2|   | 6/2002  | Pauschinger | 347/19 |
| 6,435,676 | B1|   | 8/2002  | Murray et al. | 347/87 |
| 6,527,170 | B1| * | 3/2003  | Gordon et al. | 235/375 |
| 6,866,359 | B2|   | 3/2005  | Pan et al. | 347/19 |
| 6,978,255 | B1| * | 12/2005 | Pauschinger et al. | 705/61 |
| 7,048,366 | B2|   | 5/2006  | Alexia et al. | 347/87 |
| 2002/0030714 | A1 |   | 3/2002  | Walker |   |
| 2002/0140755 | A1 | * | 10/2002 | Hetzer et al. | 347/17 |
| 2002/0188860 | A1 |   | 12/2002 | Parry et al. | 713/200 |
| 2002/0199094 | A1 | * | 12/2002 | Strand et al. | 713/150 |
| 2003/0006878 | A1 | * | 1/2003  | Chung | 340/5.25 |

FOREIGN PATENT DOCUMENTS

| DE | 19954749 A1 | 5/2001 |
|---|---|---|
| EP | 0718803 A2  | 6/1996 |
| FR | 2774494 A1  | 8/1999 |
| GB | 2354735 A   | 4/2001 |

* cited by examiner

*Primary Examiner* — John Hayes
*Assistant Examiner* — Tonya Joseph
(74) *Attorney, Agent, or Firm* — George M. MacDonald; Charles R. Malandra, Jr.; Steven J. Shapiro

(57) ABSTRACT

A franking machine is described including a unit for generating franking data and a unit for printing data connected to the data generating unit and adapted to receive franking data therefrom, the printer unit including at least one member for printing data, wherein the franking machine includes additional means for wireless communication between the print member and the data generating unit to enable identification of the print member by the data generating unit.

1 Claim, 6 Drawing Sheets

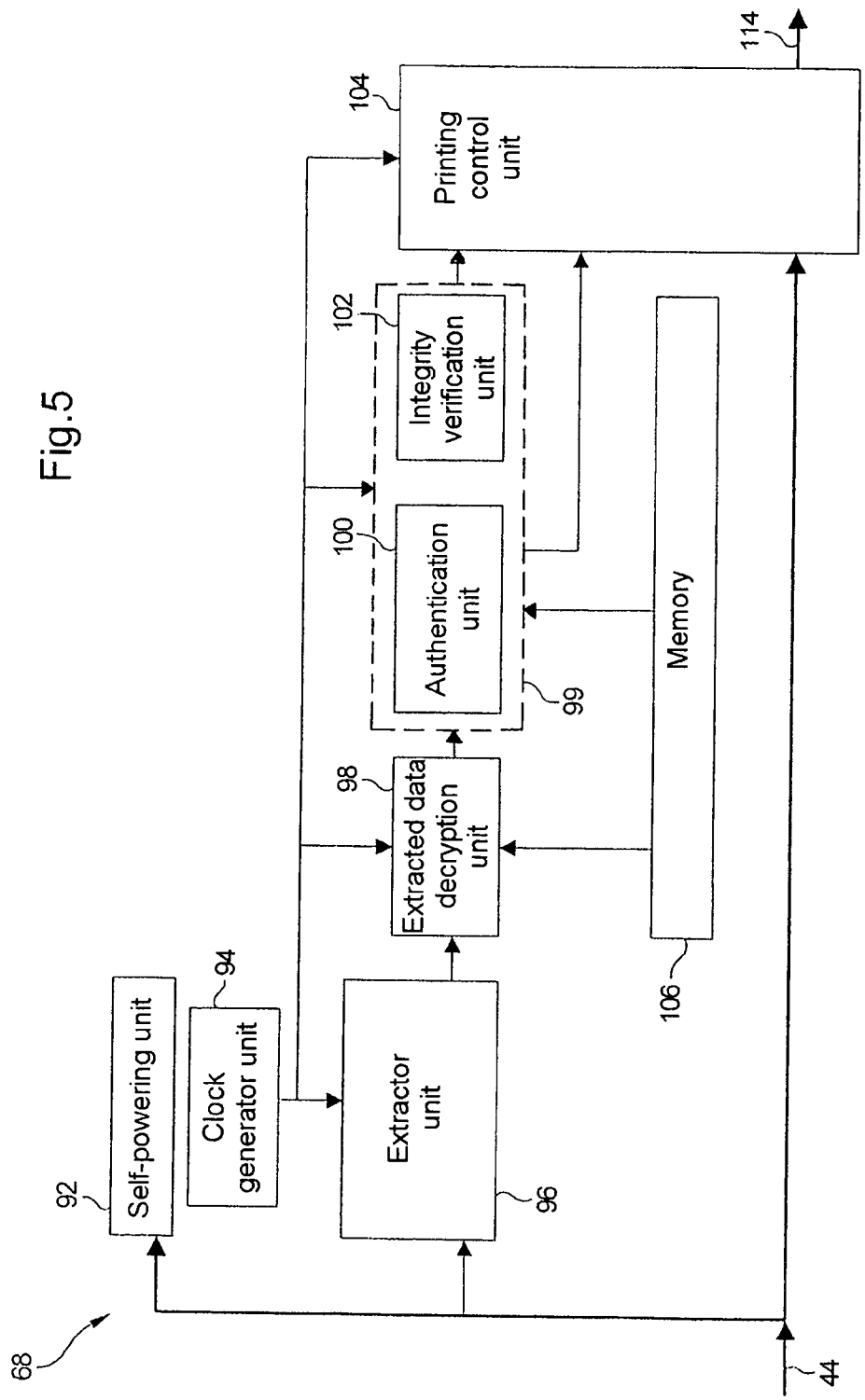

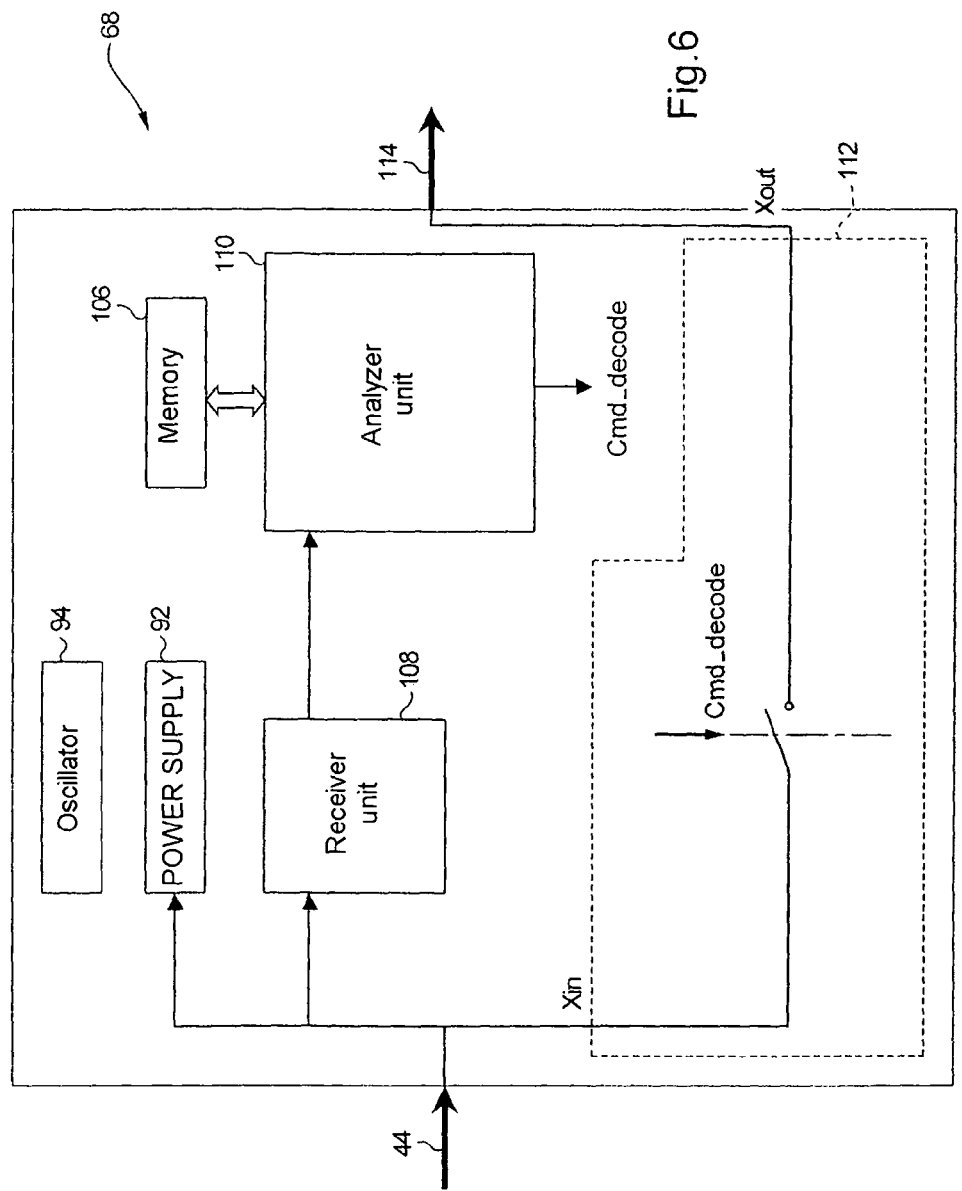

SECURE FRANKING MACHINE

BACKGROUND OF THE INVENTION

The invention relates in particular to a franking machine.

The problem of securing "sensitive" data consisting of franking data or marks arises in the field of franking machines.

In this type of machine, it is essential to secure data generated by a unit for generating franking data and sent to a printer unit (for example a printer) for the data to be printed by a print member, such as a printer cartridge, which includes an ink reservoir provided with a print head.

For example, if the data is not secure, a fraudster can intercept it between the data generating unit and the printer unit, or even within the printer unit itself. Thus when a franking mark of value X should be printed on an envelope, the fraudster can replace that mark by a franking mark of value Y greater than X.

Thus the management unit decrements its counter of franking values delivered to the printer unit by only an amount X when in reality a greater amount has been printed.

Various security methods to prevent this are known to the person skilled in the art.

In particular, encrypting the franking data in the management unit, sending it in encrypted form to the printer unit, and then decrypting it before sending it to the print member is known in the art.

However, this cannot be done with standard connections between the data generating unit and the printer unit.

Furthermore, a method of the above kind does not eliminate the risk of a fraudster intercepting the decrypted data in the printer unit and tampering with it before sending it on to the print member.

To make the securing of franking data more reliable, a dedicated print member could be provided that would include an internal circuit for decrypting data and would be inaccessible from the outside, for example a dedicated inkjet printer cartridge.

A solution of the above kind would require specific development of the print members (for example inkjet cartridges) and would therefore no longer allow the use of products available off the shelf.

A solution of the above kind could even lead to modification of the printer unit (printer) itself.

A solution of the above kind tends to make franking machines more complex.

It would consequently be beneficial to be able to secure the franking data in a franking machine in a simple, inexpensive, and efficient manner.

It would also be beneficial to secure the franking data in a franking machine without calling into question the architecture of existing franking machines, and in particular the printing technology used in the machines.

More generally, outside the context of franking machines, there exists a need for securing sensitive or confidential data coming from a data source external to conventional printing mechanisms that use a printer unit incorporating an inkjet printer cartridge.

The various aspects of the invention stated hereinabove aim to remedy at least one of the drawbacks previously cited.

SUMMARY OF THE INVENTION

In a first aspect, the invention provides a franking machine including a unit for generating franking data and a unit for printing data connected to said data generating unit and adapted to receive franking data therefrom, said printer unit including at least one member for printing data, characterized in that the franking machine includes additional means for wireless communicating between the print member and the data generating unit to enable identification of the print member by the data generating unit.

Accordingly, by using additional wireless communication means, the data generating unit is able to control the print member and in particular to verify its identity.

This ensures that the print member is authorized to receive franking data to be printed and thus that it has not been modified or replaced by a fraudster.

For example, the print member supplies authentication data to the data generating unit in the case of unidirectional communication.

The data generating unit can also look for an identifier of the print member in the latter.

If the data generating unit does not recognize the print member, it can decide not to transmit the printing command to the printer unit or to transmit a command to print erroneous or incomplete franking data.

If bidirectional communication is possible between the data generating unit and the print member, the data generating unit can decide to send a blocking command to the print member that causes it to interrupt the printing of data.

Note that the additional wireless communication means do not call into question the standard connection between the data generating unit and the printer unit that is used to transmit franking data to the latter unit.

Thus this aspect of the invention does not necessitate a specific connection between the above elements to implement the invention.

According to one feature, the wireless communication is effected by means of radio waves.

According to one feature, the print member includes at least one identification tag that communicates data identifying the print member by radio waves to the data generating unit when an electromagnetic field is applied to it.

According to one feature, the identification tag is flexible, i.e. it bends easily.

According to one feature, the identification tag includes a substrate permanently fixed to the print member and communication means on the substrate.

According to one feature, the data generating unit includes an electromagnetic field source.

According to one feature, the data generating unit includes a circuit for receiving identification data.

According to one feature, the print member is an inkjet printer cartridge including at least one print head.

In a second aspect, the invention provides an inkjet printer cartridge for printing data, characterized in that it includes at least one tag identifying the cartridge that communicates identification data to the outside by radio waves, when an electromagnetic field is applied to it, the identification tag including a substrate fixed to the cartridge and communication means on the substrate.

Thus a printer cartridge can be identified remotely without necessitating contact or a physical connection. This provides a simple way to check that the printer cartridge is an authentic cartridge and has not been replaced by a fraudster.

This aspect of the invention is useful when sensitive or confidential data must be sent to the printer cartridge by an external data source via the printer unit that incorporates the cartridge.

This is because the identity of the cartridge is checked beforehand by applying an electromagnetic field to it, and this thus makes the printing mechanism more secure by preventing the sending of sensitive or confidential data systematically.

Simply affixing a radio identification tag to an off-the-shelf inkjet printer cartridge contributes to making the cartridge, and thereby all of the printing mechanism, reliably secure, without calling into question the printing technology, and in particular without modifying the cartridge itself.

According to one feature, the inkjet printer cartridge includes a data processing unit which analyzes a stream of printing commands for controlling the print head of the cartridge to authenticate the data to be printed.

According to one feature, the processing unit includes means for verifying the integrity of data to be printed.

According to one feature, the data processing unit is a miniature unit attached to a thin and flexible printed circuit that is fixed permanently to the printer cartridge.

According to one feature, the substrate of the identification tag is permanently fixed to the cartridge so that any subsequent attempt to remove the substrate damages its communication means.

According to one feature, the identification tag is flexible.

According to one feature, the identification tag contains main identification data.

According to one feature, the identification tag contains secondary identification data relating to the use of the cartridge in a franking machine.

The second aspect of the invention also encompasses the use of the above inkjet printer cartridge in a unit for printing data.

This aspect of the invention is particularly beneficial in the field of franking machines that include a unit for printing data on a support.

In a third aspect, the invention provides a franking machine including a unit for generating franking data and a unit for printing data connected to said data generating unit and adapted to receive franking data therefrom, said printing unit including at least one member for printing data, characterized in that the franking machine includes:

means for obtaining data enabling identification of the print member by the data generating unit in a first communication mode, means for generating a signature of the franking data by the data generating unit, means for encrypting the signature of the franking data by the data generating unit, means for sending the franking data and the encrypted signature to the printing unit in a second communication mode, and means for decrypting the encrypted signature by the print member.

In a correlative way, the invention also provides a method of securing data in a franking machine that includes a unit for generating franking data and a unit for printing data connected to said data generating unit and adapted to receive franking data therefrom, said printing unit including at least one member for printing data, characterized in that the method includes the following steps:

obtaining data identifying the print member in a first communication mode by the data generating unit, generating a signature of the franking data by the data generating unit, encrypting the signature of the franking data by the data generating unit, sending the franking data and the encrypted signature to the printing unit in a second communication mode, and decrypting the encrypted signature by the print member.

In accordance with this aspect of the invention, data is printed in a secure way in existing franking machines using a given printing technology.

To this end, the print member is authenticated by obtaining its identifier.

Furthermore, there is provision for generating a signature in the data generating unit and sending franking data with the signature in encrypted form to the printing unit, which then sends them to the print member for decrypting.

The print member is capable of decrypting the encrypted signature and therefore of authenticating or not the source of the data.

Thus the data is made secure in a simple and reliable manner. If the print member cannot decrypt the signature, or does not find it, or decrypts a signature that is not that of the authorized sender, this indicates tampering upstream of said member.

In this case, if printing of the data has begun, the print member interrupts printing or allows it to continue but introduces erroneous data.

According to one feature, the print member includes means for authenticating franking data.

According to one feature, the print member includes means for verifying the integrity of the franking data.

According to one feature, the print member includes at least one tag identifying said print member which communicates data identifying said member to the data generating unit by radio waves when an electromagnetic field is applied to it.

According to one feature, the identification tag includes a substrate fixed permanently to the print member and communication means on the substrate.

According to one feature, the data generating unit includes a circuit for receiving identification data.

According to one feature, the data generating unit includes an electromagnetic field source.

According to one feature, the decrypting means of the print member have a prior knowledge of data identifying said print member.

According to one feature, the print member includes a data processing unit that includes the decrypting means.

According to one feature, the decrypting means are fixed to a thin and flexible printed circuit that is fixed to the print member.

According to one feature, the data processing unit is fixed to a thin and flexible printed circuit that is fixed to the print member.

According to one feature, the print member is an inkjet printer cartridge including at least one print head.

DESCRIPTION OF THE DRAWINGS

Other features and advantages will become apparent in the course of the following description, which is given by way of nonlimiting example only, and with reference to the appended drawings, in which:

FIG. 5 is a diagrammatic view of the data processing unit of the FIG. 3 intelligent module 54;

FIG. 6 is a more detailed view of the unit 68 of the FIG. 5 data processing unit;

DETAILED DESCRIPTION

Figure 1:
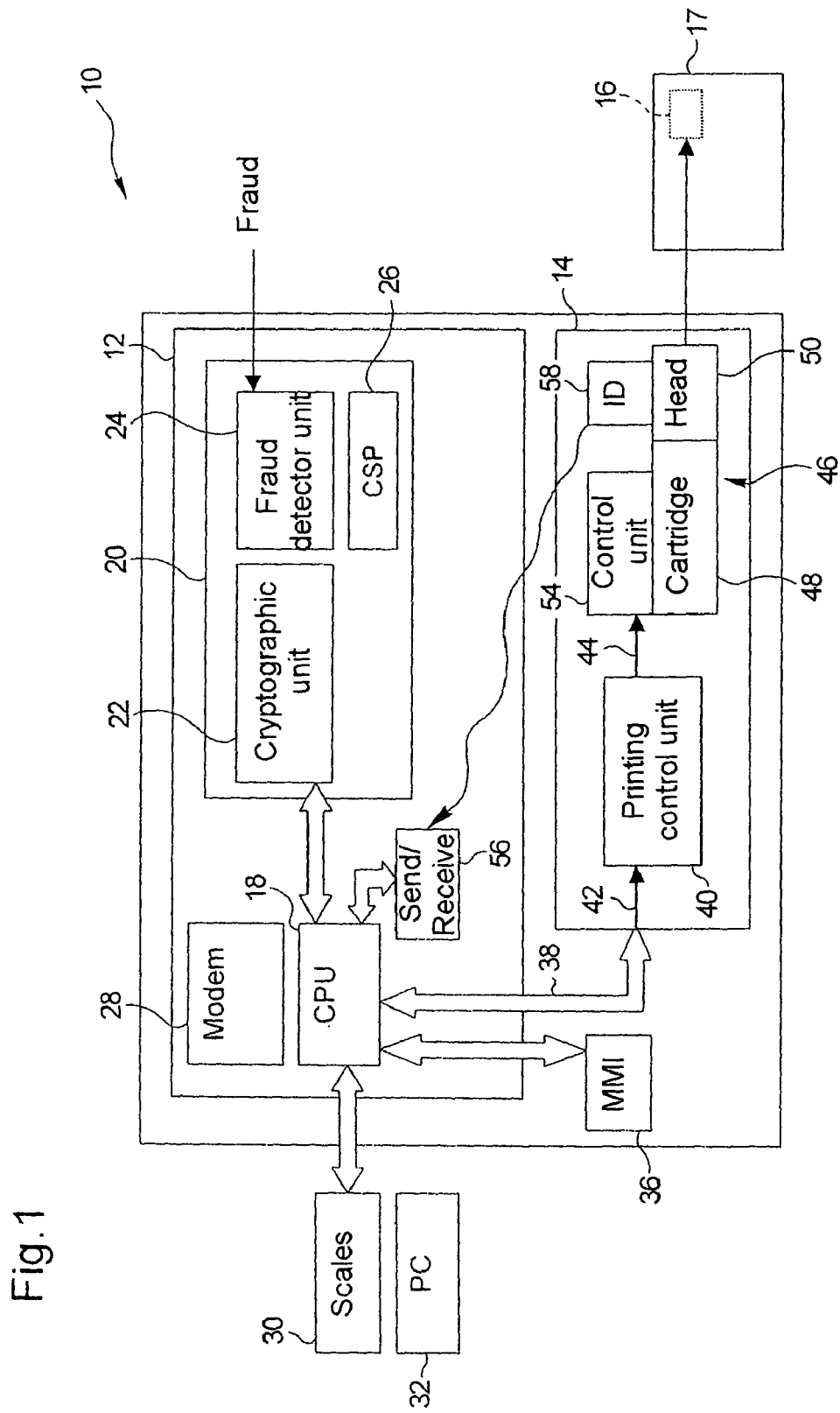
FIG. 1 is a diagrammatic representation of the architecture of a franking machine according to the invention.

The embodiment shown schematically in FIG. 1 represents the general architecture of a franking machine 10 according to the invention.

This machine generally includes two entities: a unit 12 for generating franking data and a unit 14 for printing data that receives franking data from the unit 12 in order to print it, for example in the form of a franking mark 16 on an envelope 17.

To be more specific, the unit 12 has the following functions:

composing the franking mark;

sending data to be printed to the printer unit 14 (scheduling printing of the franking mark);

managing accounting data, in the sense of managing the totalizing counter of franking amounts and imprint counters;

checking the consistency of the accounting data, which ensures the reliability of the data record for each franking cycle; and guaranteeing the integrity, confidentiality and availability of the accounting data.

As shown in FIG. 1, the unit 12, also known as a meter, includes a central data processing unit 18 that communicates with a module 20 including a cryptographic circuit 22 containing the algorithm or algorithms necessary for encrypting data, a fraud detector circuit 24 which, for example, detects attempted opening of the cover of the franking machine, for example, by means of mechanical or optical contacts, for example, and a CSP circuit 26 that is informed of attempted fraud by the circuit 24 and then deletes critical data such as the encryption keys or algorithms, for example.

The unit 12 also includes a modem 28 enabling the postal services to read the meters of the franking machine by telephone, for example for billing purposes.

The central unit 18, which includes in particular a processor or microprocessor, also communicates with scales 30 for weighing postal packets to be franked.

FIG. 1 also shows other external devices, for example a device 32, such as an electronic circuit card (PC option), for example, for emulating the man-machine interface (MMI) 36 integrated into the franking machine 10, and which conventionally includes a keyboard and a screen (not shown).

The unit 12 for generating franking data communicates with the printer unit 14 via a USB connection 38, for example.

Data and signals are exchanged between the other components of the franking machine and with external devices via cable connections. This is known in the art.

The central unit 18 communicates in particular with the module 20, the external devices 30, 32, and the man-machine interface 36 via cable connections.

The printer unit 14, which is a printer, for example, includes a printing control module 40 which receives from the unit 12 a stream of franking data to be printed and an encrypted signature 42 and converts the data received into a stream of printing commands 44 that is then sent to one or more print members 46 for printing franking data in the form of the franking mark 16.

Figure 4A:
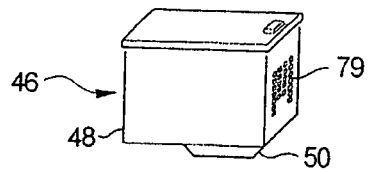
FIGS. 4a to 4h show successive operations of fitting out a printer cartridge according to the invention.

To be more specific, the print member 46 is a printer cartridge that includes an ink reservoir 48 and a print head 50 for printing data (FIGS. 1 and 4a).

The commands for printing the stream 44 control the print head 50 for printing the franking mark 16 on the support 17.

The print member 46 is rendered intelligent by the presence of a module 54 affixed to it and described in more detail later.

The franking machine 10 further includes additional wireless communication means between the print member 46 and the unit 12, enabling the latter to identify said print member.

To be more specific, the unit 12 includes a sender module 56 and the printer unit 14 includes a receiver module 58 affixed to the print member 46.

In this embodiment, wireless communication between the unit 12 and the print member 46 is performed via radio waves.

The module 58 sends data identifying the print member to the unit 12.

In this embodiment, the module 58 is a tag identifying the print member which communicates its identification data by radio when acted on by an electromagnetic field whose source is in the module 56.

When the module 56 wishes to identify a print member in order to check that it is an authorized print member, it then generates a constant magnetic field directed to the module 58 of the print member 46 and, by means of a receiver circuit, measures variations in the magnetic field generated by the module 58.

The module 58 amplitude-modulates the electromagnetic signal, so to speak.

Thus measuring the variations of the electromagnetic field provides data identifying the print member and therefore enables the nearby print member to be recognized or not.

This recognition procedure is carried out before the unit 12 for generating data sends franking data to the printer unit 14 for printing.

Note that the frequency of the electromagnetic waves emitted by the module 56 is 13.56 MHz, for example.

This remote communication and identification technology is known as radio frequency identification (RFID).

Note that the module 56 may require to write data in the identification module 58 and to this end the amplitude modulation of the electromagnetic signal is then generated directly by the module 56 itself.

Note also that the identification tag 58 is known as an RFID tag.

To be more specific, the module 56 is, for example, an electronic component commerzialized by Texas Instruments under the commercial reference HF reader system series 6000 S6700 Multi-protocol Transceiver IC.

This kind of component, also known as a transponder, manages the exchange of data and signals between the identification tag 58 and the transponder itself.

The identification tag is, for example, commerzialized by Texas Instruments under the reference Tag-It HF-1 Transponder Inlay Rectangle—Miniature.

This component has a memory space of 2 kbits accessible in read mode and in write mode and contains for each component a unique identification number (main identification data) that is accessible only in read mode.

Once the identifier has been stored in the tag, it is therefore no longer possible to modify it.

When the tag is affixed permanently to a print member, the identifier of the tag constitutes a unique identifier of the print member itself.

The identification tag also contains secondary identification data that relates, for example, to the use of the cartridge in a given application, i.e. in a franking machine in the embodiment described here.

In the context of using the printer cartridge in a data printer unit of a franking machine, secondary identification data can be specific to the franking applications, for example.

Figure 2:
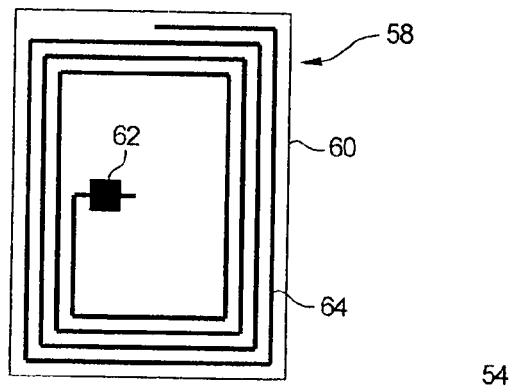
FIG. 2 is a diagrammatic view of an identification module 58 of a print member according to the invention.

FIG. 2 shows highly schematically an identification tag used in the FIG. 1 franking machine 10. Note, however, that a tag of this kind intended to be affixed to an inkjet printer cartridge provided with a print head can be used outside the field of franking machines, more generally in printer units that receive confidential and/or sensitive data from external devices.

The presence of the identification tag on a print member of a printer unit of the above kind secures the printing of confidential and/or sensitive data in that authorization to print such data is accorded only if the print member has been identified unambiguously, by means of its identification tag, during a recognition procedure executed between the source of the confidential and/or sensitive data and said print member.

Referring again to FIG. 2, the identification tag 58 includes a substrate 60 that is thin and flexible, i.e. one that bends easily, on which are provided radio communication means constituting the communication function of the identification tag. The communication means consist of an integrated circuit 62 that implements the send and receive function and an antenna 64 that picks up the magnetic field.

In the above example of an identification tag the antenna 64 is at the periphery of the substrate 60, for example.

Figure 3A:
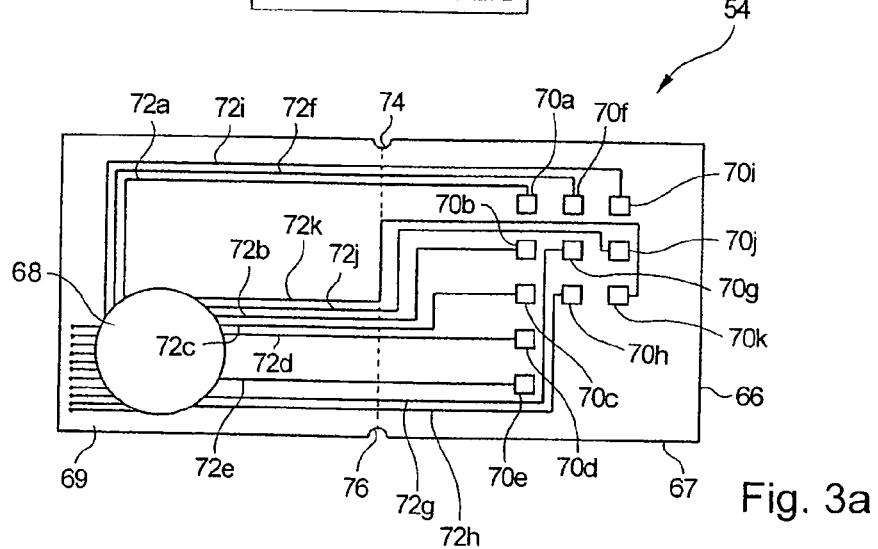
FIGS. 3a and 3b are diagrammatic views of two opposite faces of an intelligent module 54 of a printer cartridge according to the invention.
Figure 3B:
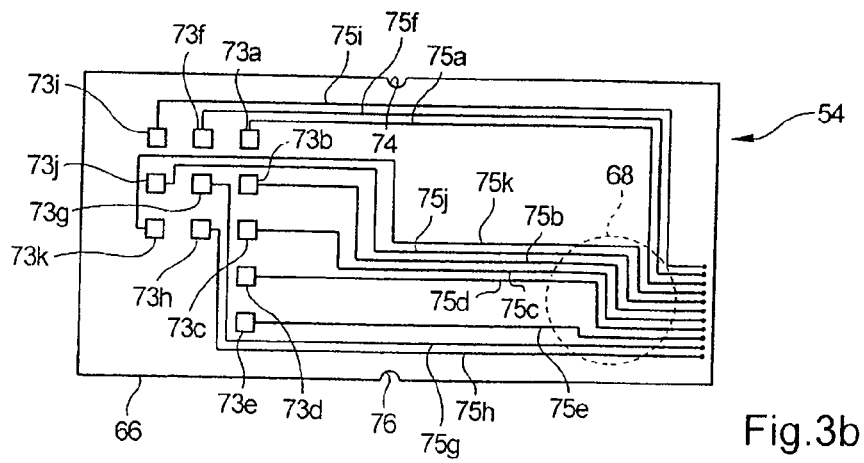

FIGS. 3a and 3b show diagrammatically the module 54 constituting the onboard intelligence of the print member.

The module 54 takes the form of a thin double-sided printed circuit that is flexible, i.e. one that bends easily, to which is attached a thin miniature data processoring unit 68.

The total thickness of the thin circuit 66 and the processing unit 68 must be sufficiently small that, when the intelligent module 54 is fixed to a standard inkjet printer cartridge 46, as described hereinafter with reference to FIGS. 4a to 4h, the bulk of the cartridge equipped in this way does not compromise the installation of the cartridge in the standard printer unit for which it is intended.

It is important that, when integrated into the printer unit, the printer cartridge forms with the components of the printer unit sufficient space to accommodate the circuit 66 equipped with the data processing unit 68.

The total thickness of the circuit 66 and the unit 68 is less than 1.5 mm, for example, enabling it to be integrated with a very large number of inkjet printer cartridges without modifying the geometry of the cartridge and its support.

The thickness of the data processing unit 68 is around 1 mm, for example (e.g. 0.9 mm), and that of the circuit 66 is less than 0.2 mm, for example.

However, for some applications where the overall size constraints relating to the installation of the cartridge on its support are less severe, a total thickness of the circuit 66 and the unit 68 from 1.5 to 2 mm can be envisaged, for example.

As shown in FIG. 3a, the circuit 66 includes on a front face a plurality of electrical contact areas 70a to 70k adapted to communicate with the processing unit 68 via respective conductive tracks 72a to 72k.

The contact areas 70a to 70k therefore receive the stream of printing commands 44 from the FIG. 1 printing control module 40 and send it to the processing unit 68.

As shown in FIG. 3a, the circuit 66 includes a plurality of conductive tracks that run from the processing unit 68 (in the bottom left-hand corner) to the opposite, rear face of the double-sided circuit, which is shown in FIG. 3b.

The circuit 66 has on the rear face a plurality of electrical contact areas 73a to 73k which are connected to the processing unit 68 via respective conductive tracks 75a to 75k that are partially represented in the left-hand portion of FIG. 3a and adapted to come into contact with the corresponding electrical contact areas 79 on the standard printer cartridge 46 shown in FIG. 4a.

Accordingly, after having analyzed the stream of printing commands 44 received via the electrical contact areas 70a to 70k, the processing unit 68 sends the commands successively via the conductive tracks 75a to 75k, the electrical contact areas 73a to 73k, and the corresponding electrical contact areas on the FIG. 4a printer cartridge, until they finally reach the print head of the cartridge, in order to control the printing operation.

Note that the FIG. 3a flexible circuit 66 has two portions that are delimited by two facing notches 74 and 76 on two parallel longitudinal edges of the support and define a bending line between those portions. As described later with reference to FIGS. 4e to 4h, the bending line allows the module 54 to be installed on two different regions of the exterior surface of the printer cartridge.

The printed circuit 66 has a first portion 67 carrying the electrical contact areas 70a to 70k and a second portion 69 carrying the processing unit 68.

Note that the processing unit 68 is implemented in programmed logic, which reduces its energy consumption.

The flexible printed circuit is made from a PTF polymer material approximately 0.125 mm thick, for example.

Note that the PTF technology employed is relatively economical and uses a polyester film for the dielectric and a silver-containing conductive ink to produce the conductive track previously cited.

This technology can produce multilayer circuits.

The data processing unit 68 is mounted on the printed circuit 66 by means of techniques known to the person skilled in the art for integrating an electronic component onto a circuit.

For example, the unpackaged component can be integrated into a TSSOP approximately 0.9 mm thick.

The component protected by its packaging is then transferred to the circuit by a technique known to the person skilled in the art and the connecting pins of the packaging are fixed to the conductive tracks of the circuit by a conductive glue which is, for example, isotropic.

The type of printed circuit used in accordance with the invention that can be permanently fixed to a printer cartridge is of the type sold by the company Parlex, for example.

FIG. 4a shows diagrammatically a standard inkjet printer cartridge 46, for example a Hewlett Packard HPc665x cartridge.

As the person skilled in the art knows, the cartridge contains an ink reservoir and a print head 50 with nozzles for ejecting ink onto the support to be printed.

As the person skilled in the art also knows, the cartridge has on its exterior surface electrical contacts 79 mounted on a thin circuit affixed to the cartridge, the electrical contacts being adapted to route the printing control signals to the print head to control the ink ejector nozzles.

Note that standard cartridges available off the shelf have no onboard intelligence and that in this case the printing control signals are therefore transmitted to the print head without analysis, in contradistinction to the present invention.

Figure 4B:
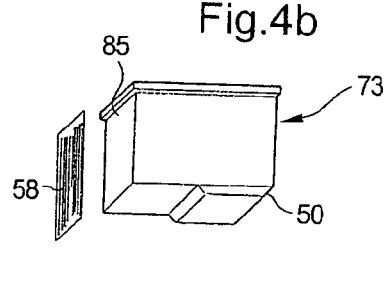
Figure 4C:
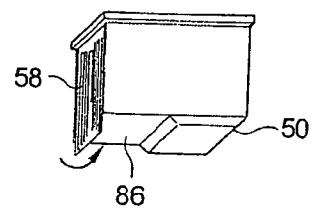
Figure 4D:
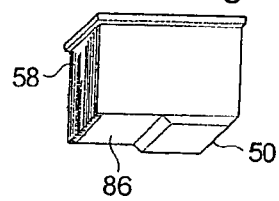
Figure 4E:
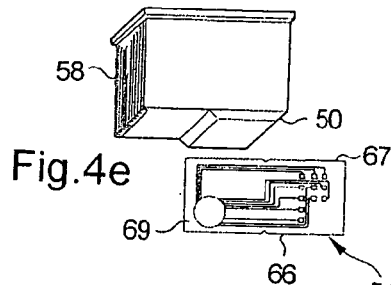
Figure 4F:
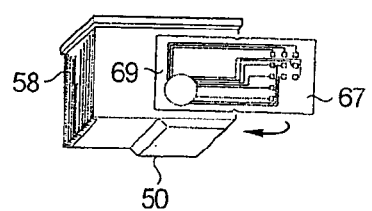

As shown in FIGS. 4b, 4c and 4d, the inkjet printer cartridge 46 shown in FIG. 4a is fitted with the identification tag previously described (the identification module 58 shown in FIGS. 1 and 2), for example by permanently gluing it to the exterior surface of the cartridge.

It is important for the substrate 60 of the identification tag to be fixed permanently to the cartridge, so that any subsequent attempt to remove the substrate, damages the communication means 62, 64 on it.

If the communication function of the identification tag is damaged, this makes it impossible for the source of confidential and/or sensitive data, for example the unit 12 for generating franking data in FIG. 1, to identify the printer cartridge concerned.

The person skilled in the art knows how to fix the substrate permanently to the cartridge, for example using glues available off the shelf, suited to the materials to be in contact, and providing a particularly intimate contact between the substrate and the exterior surface of the cartridge (FIGS. 4c and 4d).

As can be seen in the Figures, the identification tag 58 can be larger than a face 85 of the cartridge. In this case, thanks to the flexibility of the tag, it can be folded and one portion of the tag positioned on the face 85 and the other portion folded onto one of the adjacent faces 86 of the cartridge.

Once again, the identification tag 58 is particularly thin, enabling it to be integrated onto the exterior surface of the cartridge without modifying the overall external size of the latter to a degree that would compromise the installation of the cartridge in a standard printer unit.

The constraints on the thickness of the identification tag are the same as those previously indicated for the intelligent module 54.

The thickness of the tag is less than 1 mm, for example.

As shown in FIGS. 4e to 4h, the FIG. 3 printed circuit 66 is permanently fixed to the exterior surface of the printer cartridge to prevent insertion of an external element between the circuit and the cartridge itself.

To this end, the circuit 66 can be glued intimately to the exterior surface of the cartridge, for example, so that any attempt to remove the circuit 66 by unsticking it damages it and therefore makes it impossible for a fraudster to use the cartridge.

Figure 4G:
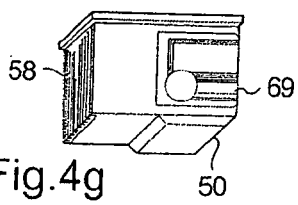
Figure 4H:
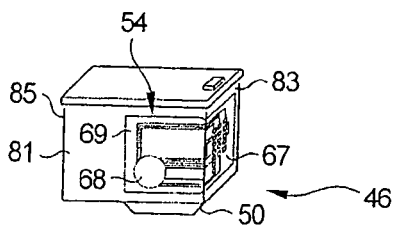

More particularly, the second portion 69 of the thin printed circuit 66 carrying the data processing unit 68 is first applied to one of the exterior faces 81 of the cartridge (see FIG. 4f), while the first portion 67, carrying the electrical contact areas, is applied to an adjacent face 83 of the cartridge (see FIGS. 4g and 4h).

It will be noted that the second portion 69 of the thin circuit 66 is preferably affixed to a region of the exterior surface of the cartridge which, when the cartridge is integrated into a printer unit, defines with the components of the printer unit sufficient space to accommodate the data processing unit 68.

Accordingly, assuming that, when the printer cartridge is integrated into a printer unit, the space in front of the external faces of the cartridge is larger in front of the face 85 of the cartridge that is opposite the face 83, it is then possible for the circuit 66 to extend from the face 83 as far as the opposite face 85 and for the data processing unit 68 to be positioned facing that face.

Of course, in this situation, the identification tag 58 must then be positioned on another free region of the exterior surface of the printer cartridge.

It should be noted that the flexibility of the modules 54 and 58 is optimally exploited so that these modules can espouse the available exterior surface of the cartridge as closely as possible.

Thus the flexibility of each module enables it to adapt to the geometry of the cartridges and to the constraints associated with the installation of the cartridges into their support in the printer unit.

However, in some applications, flexibility of one or both of the two modules 54 and 58 is not a requirement, and consequently it suffices for the module or modules to be thin.

Thus the disposition of the thicker portion of the FIG. 3 intelligent module 54 depends on the free space around the printer cartridge when it is installed in a printer unit.

Note that the FIG. 4h, inkjet printer cartridge 46 is equipped with an identification module enabling an external device (a source of confidential and/or sensitive data) to identify the cartridge, and with an intelligent module, these modules each having particular means of making the cartridge secure.

Equipment of the above kind affixed to a standard inkjet printer cartridge available off the shelf is particularly advantageous in that it does not call into question the design of the cartridge or its overall outside dimensions.

In the FIG. 1 franking machine, the data is made secure firstly by the authentication of the print member 46 by the data generating unit 12.

To this end, the unit 12 obtains data identifying the print member 46 using the wireless communication mode described above.

When the central unit 18 of the unit 12 has verified that the print member 46 is an authorized print member, the module 20 then generates a franking data signature using a mathematical method known to the person skilled in the art. The encryption circuit 22 of the module 20 then encrypts the signature generated in this way, for example using 3DES encryption, which is known to the person skilled in the art.

This kind of encryption requires the sender and the receiver to hold different encryption keys that are 128 bits long in the case of 3DES encryption.

Because decryption is effected in the processing unit 68 of the module 54, a key is written into the unit 68 when manufacturing the module 54.

This key must also be known to the sender, and therefore contained in the encryption circuit 22.

The sender 12 uses the key to encrypt the data and the receiver 54 uses it to decrypt the data.

The key can be programmed when installing the module 54 on the printer cartridge or programmed directly into the processing unit 68 during manufacturing of the module 54.

When the signature is encrypted, the unit 18 associates with it, for example concatenates with it, franking data and transmits the whole of the data, which constitutes the stream 42, over the communication link 38.

Note also that, in the embodiment described, there is no encryption as such of the franking data to be printed, although this is of course possible in a different embodiment.

Franking data to be printed can additionally be encrypted, which makes the exchange of this data between the unit 12 and the printer unit 14 more secure.

However, encryption should not be used if it necessitates too great a volume of computation, in that the processing unit 68 of the module 54 diverts the energy necessary for it to function from the printing control signals reaching it.

FIG. 5 shows diagrammatically functional units of the FIG. 3a data processing unit 68.

As shown in FIG. 5, the data processing unit 68 receives the FIG. 1 stream of printing commands 44 and analyzes it, in particular to authenticate the data to be printed.

As mentioned above, the energy necessary for the processing unit to function is diverted from the stream of printing control signals.

The data processing unit could use a microprocessor provided that there is no risk of the energy diverted degrading the printing of data.

Thus the processing unit 68 includes a self-powering unit 92 and a clock generating unit 94 that supply a particular clock frequency to each of the various units described next.

A unit 96 extracts the encrypted signature from the stream 44 of printing commands reaching the data processing unit 68 and decrypts this signature.

This is possible because the encryption key or keys are also known to the processing unit 68, because they are programmed either during manufacturing of the module 54 or when it is affixed to the print member 46.

Decryption is effected by the decryption unit 98.

The data processing unit 68 also includes a circuit 99 that includes an authentication unit 100 for authenticating the data to be printed on the basis of the analysis of the decrypted signature of the franking data.

As a matter of fact, when the unit 100 registers the presence of the signature of the franking data in the stream of printing commands, this proves the authenticity of the data to be printed.

Note further that the unit 12 for generating franking data is thereby indirectly authenticated by the print member.

It is possible to use only one level of verification, and thus to decide to authorize the printing of data as soon as the data to be printed has been authenticated.

A supplementary level of verification can also be provided, by way of the unit 102 that verifies the integrity of the data to be printed to check that, even if the data comes from an authentic source, it has not been tampered with after leaving the source.

To this end, tests are applied to the data present in the stream of printing commands.

When the integrity of the data to be printed has been recognized, then the unit 104 authorizes printing of the data.

On the other hand, if the data has not been authenticated by the unit 100 or the integrity of the authenticated data has not been recognized by the unit 102, then the unit 104 decides either not to authorize printing of the data or to generate an erroneous and therefore unusable franking mark.

To be more specific, note that the data processing unit 68 first prints a few lines of franking data, for example, and then analyzes some of the data extracted from the stream of printing commands, after which, as a function of the result of the analysis, it can authorize the printing of further lines and again analyze other data extracted from the stream of printing commands, and so on.

It should be noted that the data processing unit 68 also includes a non-volatile memory 106 whose main function is to store the dynamic values of the application, for example the cartridge manufacturing date, and the like, and where applicable to store values generated by the units 98, 100 and 102.

FIG. 6 shows in more detail some of the components constituting the FIG. 5 data processing unit 68.

The data processing unit 68 includes a serial receiver unit 108 notably including a buffer memory for the intermediate storage of data extracted from the stream 44 of printing control signals.

As shown, some of the printing control signals are used by unit 92 for self-powering the data processing unit 68.

A unit 110 for analyzing data extracted from the printing control signals and combining various functions executed by the units 98, 100, 102 and 104 in FIG. 5 supplies a signal Cmd-decode.

A circuit 112 including a logic switch selectively authorizes the passage of a signal Xout, on the basis of a printing control signal Xin, as a function of the value of the control signal Cmd-decode.

The Cmd-decode signal is produced for one or more lines of franking data and, for example, authorizes the passing and therefore the printing of a given number of lines of franking data that constitute the franking mark.

Note that the circuit 112 constitutes a pattern that is repeated several times according to the number of signals Xin obtained from the printing control signals.

The stream 114 of printing commands from the unit 68 is then transmitted to the print head 50 to control the print nozzles.

Figure 7:
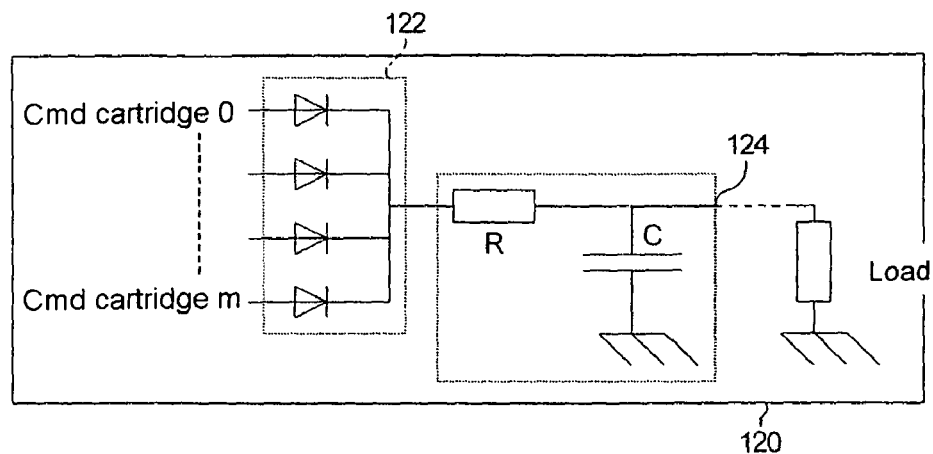
FIG. 7 is a detailed diagrammatic view of the self-powering unit 92 from FIGS. 5 and 6.

FIG. 7 shows diagrammatically the self-powering principle of the FIG. 6 unit 92.

Thus the FIG. 7 circuit 120 includes a set 122 of m diodes in parallel and each receiving one of the control signals Cmd cartridge 0 to Cmd cartridge m, each of which corresponds to data specific to one line of the image to be printed.

The set 122 of diodes implements an "OR" logic function which therefore authorizes the delivery of a signal when its state is 1.

The control signal that is allowed to pass is then filtered in a filter 124 in which the values of the components R, C are determined as a function of the value of the "load" of the circuit of the unit 68, to allow the accumulation of energy.

Figure 8:
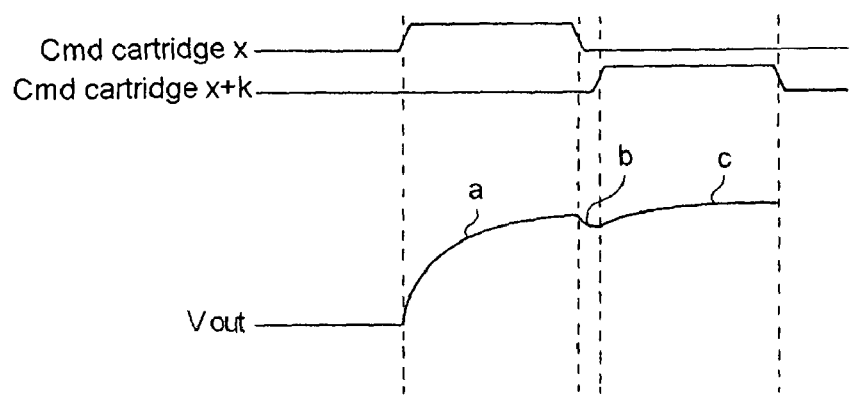
FIG. 8 shows timing diagrams of various signals for generating a self-powering signal Vout.

FIG. 8 shows timing diagrams for loading the unit 68.

Thus, as shown by the evolution of the output signal Vout of the self-powering unit, the latter signal is generated (portion a) by the detection of a first rising edge of a control signal Cmd cartridge x. When that control signal goes to 0, the self-powering signal Vout loses a little energy (portion b), but the energy level begins to rise again (portion c) after the detection of a rising edge of the next control signal Cmd cartridge x+k.

Note also that the control signals generated by the unit 12 and intended for controlling the print head 50 can have an amplitude of the order of 20 V, and the processing unit 68 therefore uses a high-voltage technology.

The core of the unit 68, which is an application-specific integrated circuit (ASIC), for example, operates at a voltage of 3.3 V or 5 V, for example, and incorporates memory in the form of RAM or EEPROM.

What is claimed is:

1. A method of securing data in a franking machine that includes a unit for generating franking data and a unit for printing data connected to said data generating unit and adapted to receive franking data therefrom, said printing unit including at least one member for printing data and means for receiving printer control signals, comprising:

obtaining data uniquely identifying and authenticating the print member in a first communication mode by the data generating unit, generating a signature of the franking data by the data generating unit, encrypting the signature of the franking data by the data generating unit using an encryption key determined using the obtained data uniquely identifying and authenticating the print member, sending the franking data and the encrypted signature to the printing unit in a second communication mode and sending a control signal using the printing control signals, and decrypting the encrypted signature by the print member.

* * * * *